(12) United States Patent
Schneidewind

(10) Patent No.: US 6,464,172 B1
(45) Date of Patent: Oct. 15, 2002

(54) METHOD AND APPARATUS FOR HEATING A VARIABLE PITCH PROPELLER MECHANISM

(76) Inventor: Steven F. Schneidewind, 28 Bouchard Dr., Brunswick, ME (US) 04011

( * ) Notice: Subject to any disclaimer, the term of this patent is extended or adjusted under 35 U.S.C. 154(b) by 0 days.

(21) Appl. No.: 09/566,519

(22) Filed: May 8, 2000

(51) Int. Cl.⁷ ............................................... B64D 15/02
(52) U.S. Cl. .............................. 244/134 R; 244/134 B; 416/95
(58) Field of Search ........................ 244/134 R, 134 B, 244/53 B, 65, 53 R; 416/93 R, 94, 95

(56) References Cited

U.S. PATENT DOCUMENTS

| | | | | |
|---|---|---|---|---|
| 2,294,790 A | * | 9/1942 | McGlasson et al. | 244/134 C |
| 2,318,233 A | * | 5/1943 | Keller | 244/134 C |
| 2,417,636 A | * | 3/1947 | Ditzler et al. | 126/99 |
| 2,751,170 A | * | 6/1956 | Feltman, Jr. | 244/134 C |
| 4,149,689 A | * | 4/1979 | McDonald | 244/134 C |
| 4,185,619 A | * | 12/1984 | Moore et al. | 60/39.093 |
| 6,109,872 A | * | 8/2000 | McCausland | 416/62 |

* cited by examiner

Primary Examiner—Galen L. Barefoot
(74) Attorney, Agent, or Firm—Charles F. Seyboldt

(57) ABSTRACT

A method and apparatus for heating a variable pitch propeller mechanism for turbo-prop aircraft is provided. Using the apparatus and method it is possible to perform inspection, troubleshooting and maintenance on hydraulic variable pitch propeller mechanisms that are located in a cold environment, without damaging the seals that are in a non-compliant condition due to being cold. The method and apparatus facilitate the performance of such inspection, troubleshooting and maintenance without the need for relocating the aircraft to a hanger and waiting a number of hours for the variable pitch propeller mechanism to reach a suitable temperature.

5 Claims, 3 Drawing Sheets

METHOD AND APPARATUS FOR HEATING A VARIABLE PITCH PROPELLER MECHANISM

BACKGROUND OF THE PRESENT INVENTION SUMMARY OF THE PRIOR ART

This invention relates to an apparatus and a method for warming a variable-pitch propeller mechanism. More particularly, this invention relates to an apparatus and method for providing a flow of warm or hot air through an opening in the "spinner", or cover, of a variable pitch propeller mechanism.

Turbine-driven aircraft propellers may be equipped with a variable pitch mechanism. The purpose of this variable pitch mechanism is to permit the operator of the aircraft to "feather" the propeller or propellers, in order to effect a change in the amount of thrust provided to the aircraft by the propeller(s). This is valued because a change in propeller pitch can be performed more rapidly than a change in propeller rotational (angular) velocity, thereby giving the operator of the aircraft a responsive means for changing the amount of thrust applied to the aircraft.

An aircraft that is powered by a turbine engine or engines, having variable pitch propeller mechanism(s) and variable pitch propeller(s) is commonly referred to as a turbo-prop aircraft to distinguish it from a turbine driven aircraft without a propeller. Further, the combination of a turbine engine, transmission, variable pitch propeller and variable pitch propeller mechanism may itself be referred to as a turbo-prop, or as turbo-prop machinery.

Variable pitch mechanisms are produced in varying forms and configurations. In one family of configurations, hydraulic fluid, under pressure, is used to vary the pitch of the propeller blades. In mechanisms that use hydraulic actuation principles, seals are provided at numerous points within the variable pitch propeller mechanism to keep the oil contained within the hydraulic circuit, and thereby to prevent undesirable leakage of hydraulic fluid.

In order to insure reliable function, it is customary and necessary that routine inspection and troubleshooting be performed on various aspects of turbo-prop machinery. In some cases, for example to check whether the proper amount of fluid is in the hydraulic circuit, these procedures involve manually changing the pitch of the propeller. That is, in order to evaluate certain aspects of the condition of the variable pitch mechanism, the pitch of the blades is changed while the turbine engine is stationary, by grabbing one (or more) blade(s) of the propeller and twisting it, or by other means such as providing an external supply of hydraulic pressure to actuate a change in pitch. This manual manipulation must be done with the turbine engine off, and is usually done after the engine has been off for a significant period of time, e.g. overnight or a period of at least several hours.

In certain environments, and particularly in cold environments, the elastomeric material comprising the hydraulic seals becomes less compliant, i.e. the elastomer becomes rigid and takes a set. When the elastomeric material of the seal is in this non-compliant condition, the manual manipulation (i.e. moving by hand or other means while the turbine engine is stationary) or other movement of the variable pitch aspect of the propeller can result in damage to the seals. Seal replacement is time consuming and costly, and has an adverse impact on the ability to operate aircraft on schedule.

In order to avoid damaging the cold seals, it is necessary that the variable pitch propeller mechanism, including the seals, attain a warmer temperature before the pitch of the propeller blades is manually changed. The only practice for causing the increase in component temperature, before the introduction of the present invention, has been to tow the aircraft to a heated hangar structure in order to effect the necessary warming. After the aircraft and variable pitch propeller mechanism have soaked in the heated hangar structure for a period of time sufficient to warm the elastomeric material of the seals, the variable pitch propeller mechanism can be manually manipulated without causing damage to the elastomeric material of the seals.

The procedure of heating an entire aircraft in order to facilitate the inspection of the variable pitch propeller mechanism requires that the aircraft be in a heated hangar structure for at least two hours. This procedure is expensive, because it requires a large volume of space to be heated in order to facilitate the inspection and maintenance of the variable pitch propeller mechanism, and it requires personnel and equipment to relocate the aircraft by towing it; it has the effect of limiting the capacity for inspection and maintenance in cold climates because the only variable pitch propeller mechanisms that can be inspected and/or maintained are those that have been in the hanger for a period of time; and it has an adverse impact on the ability to operate a fleet of turbo-prop aircraft into cold climates (or areas where a spell of cold weather is present, even if the climate is not cold) where hangar facilities may not exist.

The prior art relating to the heating of turbo-prop machinery, and particularly for heating the variable pitch propeller mechanism, does not address the specific matter of facilitating the maintenance of a hydraulic variable pitch propeller mechanism that is situated in a cold location.

U.S. Pat. No. 4,930,725 to Crag E. Thompson discloses a spinner configuration applied to a variable pitch propeller mechanism on a turbo-prop aircraft of the "pusher" variety. This is a configuration wherein the variable pitch propeller and variable pitch mechanism are located behind the turbine engine, and are subjected to the impingement of hot exhaust gases that result from the combustion within the turbine engine. One object of the '725 patent is to keep the bases of the propeller blades from being affected by the flow of hot turbine exhaust; that is, the object is to keep the general vicinity of the propeller and variable pitch mechanism cool, rather than to promote the introduction of heat.

U.S. Pat. No. 4,393,650 to Francis C. Pool discloses a spinner configuration for covering the spinner of a turbine engine, where the turbine engine does not transmit its power to a propeller, but rather the direct thrust of the turbine engine is used to propel the aircraft. A portion of the spinner according to the '650 patent is made of a flexible material for the purpose of impeding the formation of a thick ice layer on the spinner during flight operations.

U.S. Pat. No. 5,793,137 to James Andrew Timothy Smith discloses an electrical generator arrangement that may be applied to turbo-prop machinery. The electrical power produced by the generator according to the '137 patent may be used to operate aircraft deicing facilities on the propeller(s) (column 2 line 50), the spinner that covers the variable pitch mechanism (column 2, line 50) or the leading edge of the aircraft wing (column 2, line 57).

SUMMARY OF THE PRESENT INVENTION

The present invention is a method of warming a hydraulic variable pitch propeller mechanism using a flow of forced warm or hot air. This method may be practiced in the open, that is, it is not necessary to have the aircraft in a hangar structure in order to warm the variable pitch propeller mechanism.

The spinners on turbo-prop machinery that are equipped with hydraulic-actuated variable pitch propeller mechanisms typically have a hole in the front, for the purpose of admitting cooling air during the flight operation.

The method of the present invention may be practiced by forcing a volume of heated air into the volume defined by the spinner, using a structure that directs the flow of heated air into the hole in the front of the spinner. The source of forced heated air could be a ground-based heater unit having a flexible hose, and the structure for directing the flow of heated air could be a tube having an outside diameter that is slightly less than the inside diameter of the hole inside the spinner.

Using the method of the present invention, it is possible to warm a variable pitch propeller mechanism in about 10 minutes. This represents a significant saving of time over the previous method, which required first that the airplane be taken to a heated hanger, and second, a wait of at least two hours before the inspection and maintenance could commence (when the inspection requires the manual manipulation of the propeller pitch).

One object of the present invention is to provide a method of warming a cold variable pitch propeller mechanism for the purpose of inspection and maintenance without having to relocate an aircraft to a heated hangar structure.

Another object of the present invention is to reduce the length of time required to warm a cold variable pitch propeller mechanism for the purpose of inspection and maintenance.

It is another object of the present invention to warm a cold variable pitch propeller mechanism for the purpose of inspection and maintenance using facilities that are usually available at aircraft landing strips.

Another object of the present invention is to provide a method of warming a cold variable pitch propeller mechanism for the purpose of inspection and maintenance that may be practiced by a turbo-machinery mechanic or by other ground crew personnel.

The present invention relates to a method and apparatus for heating a variable pitch propeller mechanism that may be adapted and adjusted to accommodate any given propeller spinner configuration, and to accommodate any given source of forced hot or warm air. Specific features of the invention will be apparent from the above and from the following description of the illustrative embodiments when considered with the attached drawings and the appended claims.

In summary, and in accordance with the above discussion, the foregoing objectives are achieved in the following embodiments.

1. A method for heating a variable pitch propeller mechanism that is located in a cavity defined by a spinner, comprising the steps of:
   a) taking a supply of warm forced air;
   b) providing a facility to direct the supply of forced air into the cavity defined by the spinner; and
   c) directing the supply of warm forced air into the cavity defined by the spinner.

2. A method for heating a variable pitch propeller mechanism as described in paragraph 1, wherein:
   the front of the spinner has a hole;
   the facility to direct the supply of forced air into the cavity defined by the spinner comprises a flexible hose; and further comprises a tubular construction where one end of the tubular construction fits into the hole in the front of the spinner and the other end of the tubular construction is fastened to an end of the flexible hose.

3. A method for heating a variable pitch propeller mechanism as described in paragraph 2, wherein the tubular construction has:
   a smaller diameter front portion that fits into the hole in the front of the spinner;
   a larger diameter flange portion that fits the flexible hose; and
   a transition portion between the smaller diameter front portion and the larger diameter flange portion.

4. A method for heating a variable pitch propeller mechanism as described in paragraph 2, wherein:
   the facility to direct the supply of forced air into the cavity defined by the spinner further comprises a screen.

5. A method for heating a variable pitch propeller mechanism as described in paragraph 1, wherein:
   the front of the spinner has a hole;
   the facility to direct the supply of forced air into the cavity defined by the spinner comprises a flexible hose; and further comprises a hollow structure where the interior surface of one end of the hollow structure conforms to the outside surface of the spinner, and the other end of the hollow structure is fastened to an end of the flexible hose.

6. A method for heating a variable pitch propeller mechanism as described in paragraph 5, wherein:
   the facility to direct the supply of forced air further comprises a screen.

7. A method for heating a variable pitch propeller mechanism that is located in a cavity defined by a spinner, comprising the steps of:
   a) providing a facility to create a supply of warm forced air;
   b) providing a facility to direct the supply of warm forced air into the cavity defined by the spinner, where the facility to direct the supply of warm forced air is integral with the facility to create the supply of warm forced air; and
   c) directing the supply of warm forced air into the cavity defined by the spinner.

8. A method for heating a variable pitch propeller mechanism as described in paragraph 7, wherein:
   the facility to create a supply of warm forced air comprises an electrically-powered heating element and an electrically-powered blower.

9. A method for heating a variable pitch propeller mechanism as described in paragraph 7, wherein:
   the facility to direct the supply of forced air into the cavity defined by the spinner comprises a tubular construction where the end of the tubular construction fits into the hole in the front of the spinner.

10. A method for heating a variable pitch propeller mechanism as described in paragraph 9, wherein:
    the facility to direct the supply of forced air into the cavity defined by the spinner further comprises a screen.

11. A method for heating a variable pitch propeller mechanism as described in paragraph 7, wherein:
    the facility to direct the supply of forced air into the cavity defined by the spinner comprises a hollow structure where one end of the hollow structure conforms to the outside of the spinner.

12. A method for heating a variable pitch propeller mechanism as described in paragraph 11, wherein:

the facility to direct the supply of forced air into the cavity defined by the spinner further comprises a screen.

DESCRIPTION OF THE PREFERRED EMBODIMENTS OF THE PRESENT INVENTION

Figure 1:
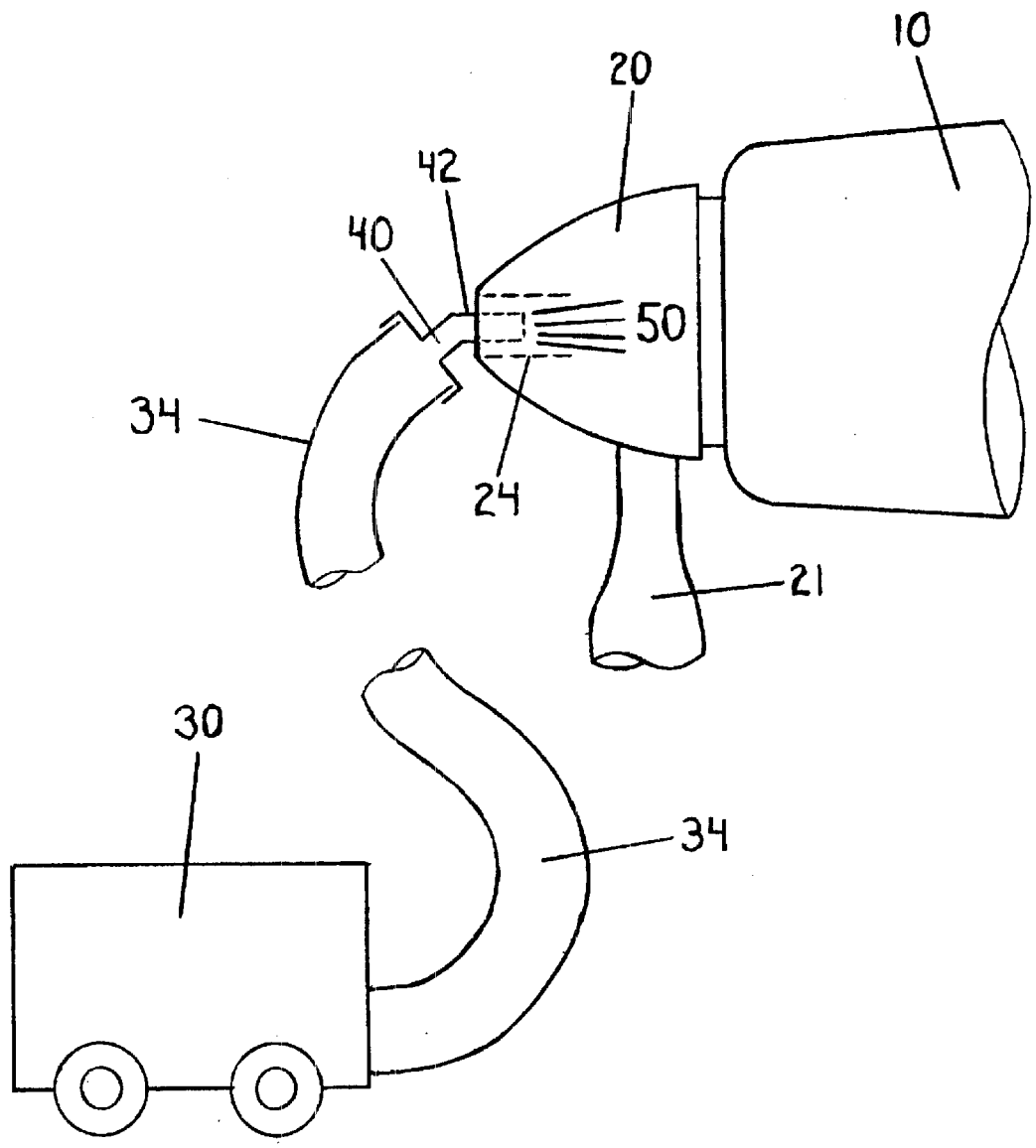
FIG. 1 is a diagram showing the application of one embodiment of an apparatus for practicing the method of the present invention.

FIG. 1 is a diagram showing the application of one embodiment of an apparatus for practicing the method of the present invention.

A cover (10) of a turbine engine is shown, where one propeller (21) is shown, and the variable pitch propeller mechanism (not shown) is located inside the volume described by the spinner (20).

In one embodiment, the method and apparatus for heating a variable pitch propeller mechanism utilizes a source of warm or hot forced air (30) such as may be located on an airport tarmac, where the output of hot or warm forced air is directed to a flexible hose (34). The typical form of the warm or hot forced air source is a trailer-mounted apparatus having a source of heat such as a resistance element or burner, combined with a blower and with controls for the operation of the source of heat and the blower. The typical use of the of the provided warm air is to warm the cargo, crew or passenger compartment of the aircraft for the purpose of comfort, or preservation of cargo that will be damaged if chilled or frozen.

The warm forced air courses through the flexible hose (34) and through the adapter (40) and emerges as a flow of warm air (50). One end (42) of the adapter (40) is inserted into a hole (24) in the front of the spinner (20), and the flow or supply of warm air (50) is thereby directed into the cavity that contains the variable pitch propeller mechanism.

Figure 2:
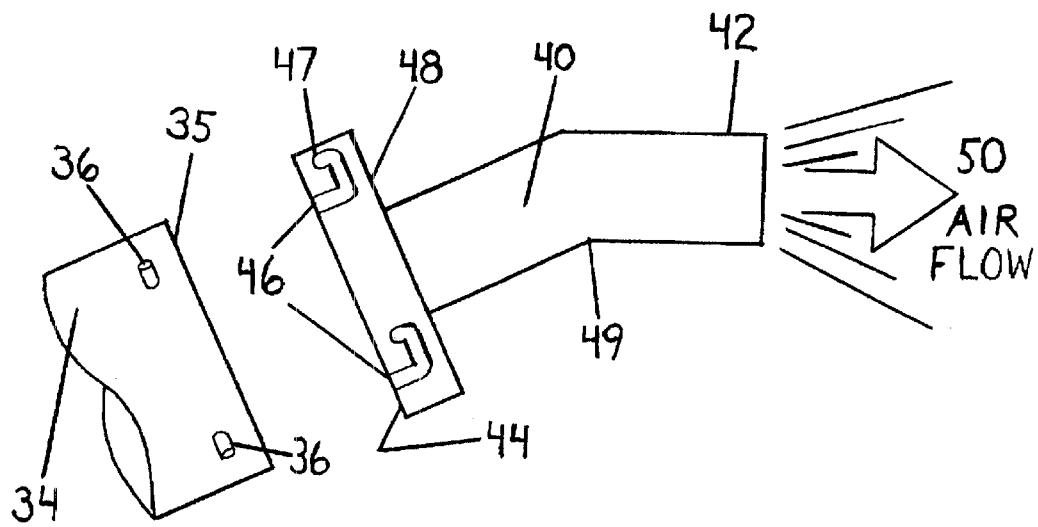
FIG. 2 is an elevation view of the FIG. 1 embodiment of an apparatus for practicing the method of the present invention.

FIG. 2 is an elevation view of the FIG. 1 embodiment of an apparatus for practicing the method of the present invention.

In the preferred embodiment, an adapter (40) is provided where one end (44) of the adapter attaches to the output end (35) of the flexible hose (34), and where the other end of the adapter (42) fits into the hole in the front of the spinner (24). Typically, the flexible hose is about 6 inches (150 millimeters) in diameter, and the hole in the front of the spinner is about 2 and a half inches (63 millimeters) in diameter. The clearance between the outside diameter of end (42) of the adapter and the inside diameter of spinner hole (24) is such as to permit insertion without forcing, i.e. an air-tight seal is not required. It is contemplated that adapter (40) could be fabricated in such a way to facilitate the addition of an elastomeric member to effect a sealing between the outside diameter of adapter end (42) and the inside diameter of spinner hole (24), and such an addition is contemplated to be within the scope of the present invention.

Adapter (40) is preferably fabricated from a durable but lightweight material, such as aluminum. However, it is contemplated that alternative materials such as steels or plastics could be used to practice the method of the present invention.

In one embodiment, the adapter (40) has an abrupt transition (48) from the hose diameter to the spinner hole diameter. However, gradual transitions are contemplated to be within the scope of the present invention, and may prove advantageous either to improve performance or to reduce the cost of fabrication.

The length of adapter end (42) is such that about 2 diameters are available for insertion into the spinner hole (24). In this specific embodiment, this length is about 5 inches (125 millimeters). This length permits the adapter to support its own weight, and the weight of flexible hose (34), without the need for clamps or other supports. That is, the hanging weight of the hose and adapter combined is carried by the hole (24) in the spinner (20).

To ease the insertion of the adapter end (42) into the spinner hole (24), the adapter may be produced with a bend (49) of about 30 degrees. When the adapter (40) is so bent, it permits the flexible hose (34) to fall or lie naturally, i.e. to adopt a path that is not conducive to kinking or to urging adapter end (42) to an attitude that resists insertion into the spinner hole (24).

Flexible hose (34) may have a number of dowel pins (36) or similar protrusions near its end (35). Typically, the flexible hose will have three such dowel pins, equally spaced (i.e. 120 degrees apart). To facilitate a quick connection to flexible hose (34), the adapter (40) may have three equally spaced slots (46) cut into end (44). To facilitate the retention of the adapter (40) on the end of flexible hose (34), these slots are preferably curved, so that the adapter (40) may first be placed axially onto the end of flexible tube (34), with slots (46) aligned with pins (36); and then the adapter may be rotated so that the pins approach the ends (47) of the slots (46).

An adapter of this design has been produced and the method of the present invention has been successfully practiced on aircraft, whereby the time required to bring the variable pitch propeller mechanism to a suitable temperature was about 10 minutes.

Figure 3:
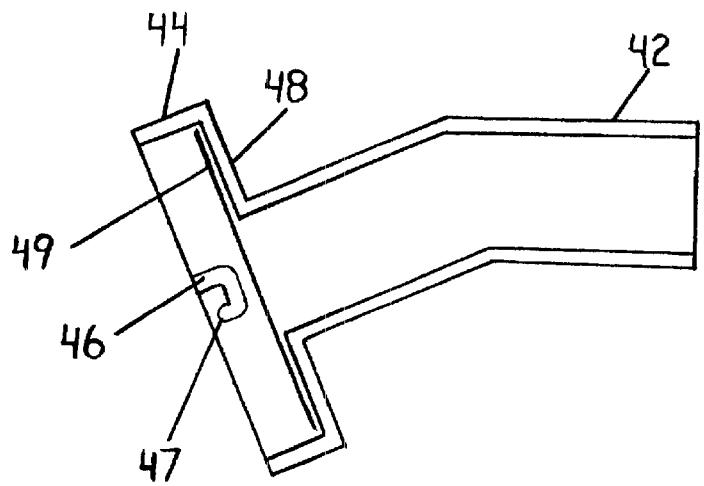
FIG. 3 is a sectional view of the FIG. 1 embodiment of an apparatus for practicing the method of the present invention.

FIG. 3 is a sectional view of the FIG. 1 embodiment of an apparatus for practicing the method of the present invention.

The variable pitch propeller mechanism can conceivably be damaged by the introduction of foreign materials into the volume that it occupies. More specifically, the introduction of larger objects, or abrasive sand and dust that might be carried in the supply of forced air could result in damage to the variable pitch mechanism. In many cases, the external supply of forced air (30) is equipped with filters and/or screens to keep the supply of forced air free of potentially damaging debris. Alternatively, adapter (40), or a similar adapter, could be equipped with a filter or a screen (49) having a suitable mesh size. Screen (49) could be trapped between the end (35) of flexible hose (34) and the transition area (48) of adapter (40), or the screen or filter (49) could be fastened in place with any fasteners, adhesives, clips, or similar devices that are known to those skilled in the art.

Figure 4:
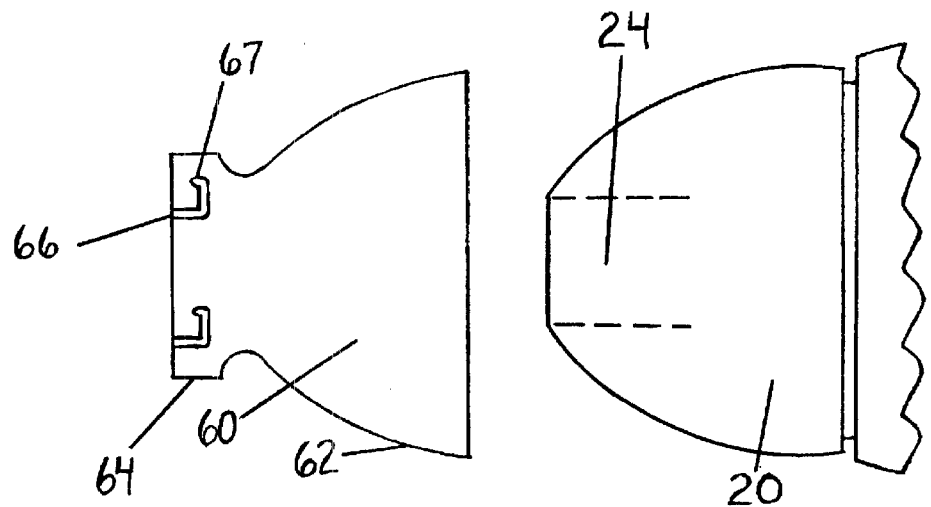
FIG. 4 is a elevation view of a first alternative embodiment of an apparatus for practicing the method of the present invention.

FIG. 4 is a elevation view of a first alternative embodiment of an apparatus for practicing the method of the present invention.

The method of the present invention can be practiced with any apparatus that directs sufficient supply of warm forced air into the cavity defined by the spinner. For example, an adapter (60) is envisioned where, in place of tube end (42), a hollow construction (62) could be provided, where the interior shape of hollow construction (62) conforms to the outside shape of the spinner (20). The facilities for fastening adapter (60) to flexible hose (34) could be as described above, i.e. with end (64) of the adapter fitting over the end (35) of the hose, and slots (66) of the adapter engaging pins (36) of the flexible hose.

Figure 5:
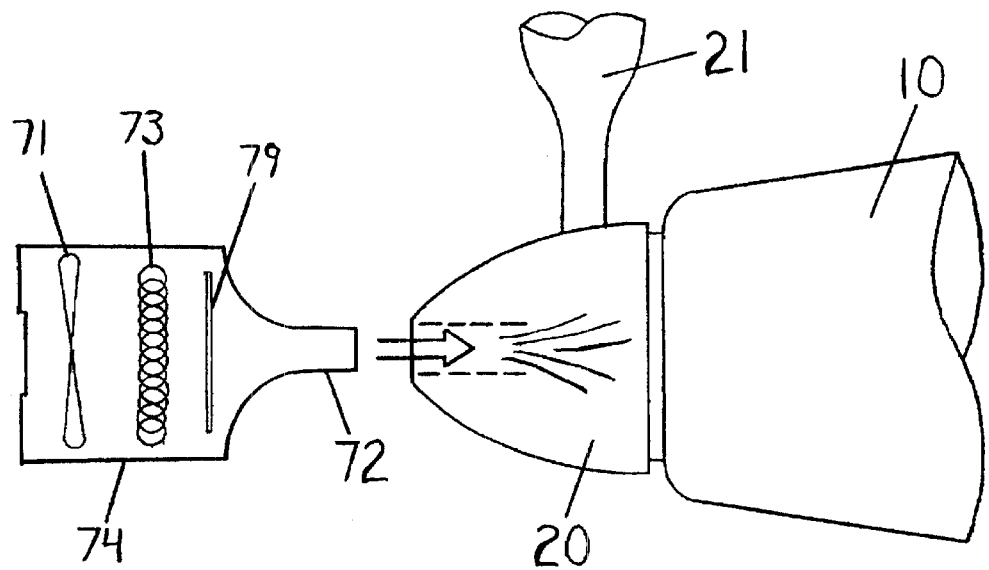
FIG. 5 is a diagram of a second alternative embodiment, where the apparatus for practicing the method of the present invention includes an integral source of hot or warm forced air.

FIG. 5 is a diagram of a second alternative embodiment, where the apparatus for practicing the method of the present invention includes an integral source of hot or warm forced air.

The method of the present invention can be practiced even where an external supply of warm forced air (30) is not available. It is contemplated that a supply of warm forced air will be integrated with a facility to direct most of the warm air into a spinner, so that with only an electrical supply, a mechanic can quickly warm a cold variable pitch propeller mechanism for inspection and maintenance. In the diagram of FIG. 5, housing (74) contains a blower (71) of any type, e.g. axial fan, squirrel cage, etc.; an electric resistance heating element (73); and a screen or filter (79). The resulting supply of warm air (80) exits tube (72) that is configured for an appropriate fit to hole (24) in spinner (20). The integral "supply warm air and direct warm air" embodiments could be configured in a variety of ways, e.g. to fit the external shape of the spinner, as described in the embodiment shown in FIG. 4; or with a tube discharge (72) bent in such a way that the weight of the blower and heater is directly under the spinner.

The drawings necessarily show specific structural arrangements embodying the invention. However, it will be appreciated that the invention can be practiced in various forms and structural combinations.

The present invention, described above, relates to a method and apparatus for heating a variable pitch propeller mechanism. Features of the present invention are recited in the appended claims. The drawings contained herein necessarily depict structural features and embodiments of the apparatus for heating a variable pitch propeller mechanism, useful in the practice of the present invention.

However, it will be appreciated by those skilled in the arts pertaining thereto, that the present invention can be practiced in various alternate forms, proportions, and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What I claim is:

1. A method for heating a stationary variable pitch propeller mechanism that is located in a cavity defined by a spinner, where the front of the spinner has a hole, comprising the steps of:
    a) taking a supply of warm forced air;
    b) providing a facility to direct the supply of forced air into the cavity defined by the spinner; wherein the facility to direct the supply of forced air comprises
        a flexible hose,
        a tubular construction where one end of the tubular construction fits into the hole in the front of the spinner and the other end of the tubular construction is fastened to an end of the flexible hose; and
    c) directing the supply of warm forced air through the hole in the front of the spinner.

2. A method for heating a variable pitch propeller mechanism as described in claim 1, wherein the tubular construction has:
    a smaller diameter front portion that fits into the hole in the front of the spinner;
    a larger diameter flange portion that fits the flexible hose; and
    a transition portion between the smaller diameter front portion and the larger diameter flange portion.

3. A method for heating a variable pitch propeller mechanism as described in claim 1, wherein:
    the facility to direct the supply of forced air into the cavity defined by the spinner further comprises a screen.

4. A method for heating a stationary variable pitch propeller mechanism that is located in a cavity defined by a spinner, where the front of the spinner has a hole, comprising the steps of:
    a) providing a facility to create a supply of warm forced air;
    b) providing a facility to direct the supply of warm forced air into the cavity defined by the spinner, where the facility to direct the supply of warm forced air
        is integral with the facility to create the supply of warm forced air and
        further comprises a tubular construction where one end of the tubular construction fits into the hole in the front of the spinner; and
    c) directing the supply of warm forced air through the hole in the front of the spinner.

5. A method for heating a variable pitch propeller mechanism as described in claim 4, wherein:
    the facility to direct the supply of forced air into the cavity defined by the spinner further comprises a screen.

* * * * *